United States Patent [19]

Freeburg

[11] Patent Number: 5,036,515
[45] Date of Patent: Jul. 30, 1991

[54] BIT ERROR RATE DETECTION

[75] Inventor: Thomas A. Freeburg, Arlington Heights, Ill.

[73] Assignee: Motorola, Inc., Schaumburg, Ill.

[21] Appl. No.: 358,773

[22] Filed: May 30, 1989

[51] Int. Cl.[5] .................. G06F 11/00; H04B 17/00
[52] U.S. Cl. .............................. 371/5.5; 371/4;
371/5.1; 455/277
[58] Field of Search ............ 371/4, 5.1, 5.2, 5.5,
371/6, 56; 375/17, 40; 455/277

[56] References Cited

U.S. PATENT DOCUMENTS

| | | | |
|---|---|---|---|
| 3,418,631 | 12/1968 | Sipress et al. | 371/56 |
| 4,367,550 | 1/1983 | Douverne | 371/5.2 |
| 4,499,606 | 2/1985 | Rambo | 455/277 |
| 4,584,713 | 4/1986 | Bruckert et al. | 455/277 |
| 4,628,507 | 12/1986 | Otani | 371/5.2 |
| 4,873,702 | 10/1989 | Chiu | 375/76 |
| 4,920,543 | 4/1990 | Martin | 371/5.5 |

*Primary Examiner*—Charles E. Atkinson
*Attorney, Agent, or Firm*—F. John Motsinger

[57] ABSTRACT

There is provided a scheme for bit error rate detection. It comprises: detecting the bit value present in a received multi-level signal, more narrowly detecting the bit value present in that received multi-level signal, comparing the results of narrow detection with the results detected otherwise to identify errors in detection, and accumulating detected symbol errors over unit time. Bit error rate detection can be used for antenna selection—selecting one of a plurality of diversity antennas when the error rate exceeds a certain error threshold.

20 Claims, 1 Drawing Sheet

BIT ERROR RATE DETECTION

THE FIELD OF INVENTION

This invention is concerned with error detection. More particularly, this invention is concerned with bit error rate detection in multi-level data signals.

BACKGROUND OF THE INVENTION

Conventionally, received bit error rates are determined by one of two methods: by transmitting from time to time a known symbol pattern of sufficient length to have a high probability of at least one error, or by including an error-detecting code in the normal data and keeping a count of the errors so found. Either of these methods have the problem of requiring many bits of transmitted data to make an accurate estimate of the bit error rate. For instance, if the expected bit error rate is 1 in 100 thousand (a typical figure), an accurate estimate of the actual error rate would require the evaluation of several hundred thousand bits.

The additional system overhead bits required by either of these schemes undermines system throughput and constrains BER measurements to ensue on specific events or at specific predetermined intervals.

This invention then takes as its object to overcome these shortcomings and to realize certain advantages presented below.

SUMMARY OF THE INVENTION

There is provided a scheme for bit error rate detection. It comprises: detecting the bit value present in a received multi-level signal, more narrowly detecting the bit value present in that received multi-level signal, comparing the results of narrow detection with the results detected otherwise to predict errors in detection, and accumulating these results over time. This scheme can be used for antenna selection by selecting one of a plurality of diversity antennas when the predicted error rate exceeds a certain threshold.

DESCRIPTION OF THE DRAWINGS

Additional objects, features, and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

In systems that employ very high-speed data rates, multi-level data symbols are common since any given symbol takes on a value that would ordinarily require two or more binary bits to convey. However, multi-level symbols are more difficult to correctly recover and detect because the detector needs to detect not only the polarity of the symbol (in bipolar pulse systems, as with binary symbols), but also detect the level as well.

Figure 1:
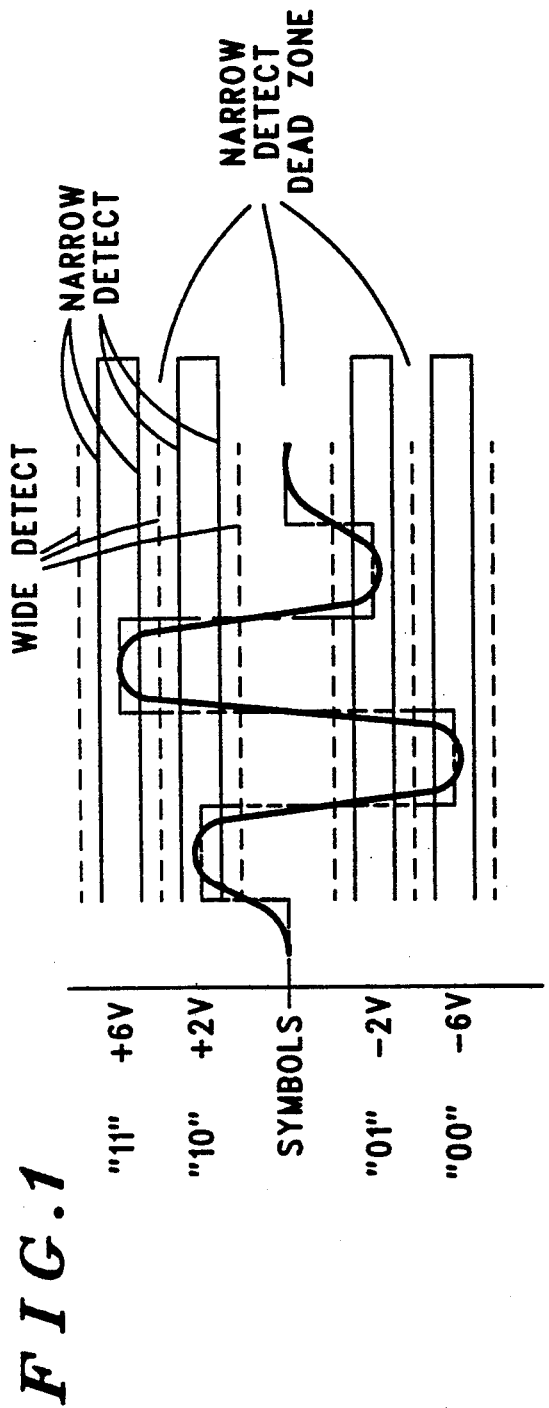
FIG. 1 is a waveform diagram of the bit value and voltage level of a multi-level symbol signal.

FIG. 1 is a waveform diagram of the bit value and voltage level of a multi-level symbol signal. For example, the multi-level signal of FIG. 1 illustrates five levels representing (arbitrarily) an idle (or noisy) state at 0 volts and one of four possible (dual binary digit) symbol values:

"00" at the most negative level (nominally −6 volts);
"01" at the less negative level (nominally −2 volts);
"10" at the least positive level (nominally +2 volts); and
"11" at the most positive level (nominally +6 volts).

Conventionally, this received signal—this multi-level symbol—would be detected with a set of three separate level detectors, each having a voltage detection range centered between nominal levels, establishing bands centered about the nominal level, as illustrated by the phantom bands of FIG. 1.

The instant invention utilizes the conventional method of detecting a received signal (detailed above), but then employs another set of bands also centered about the nominal level, but having a narrower detection range—about half as wide, as illustrated by the solid bands of FIG. 1. Under strong signal conditions with little noise or interference present, both sets of detectors should yield identical results, but as noise or interference increases, their outputs begin to differ. Under conditions of appreciable noise or interference, signal levels might move outside the narrow bands (while still, perhaps, remaining within the wider bands). Since there is little or no dead zone between adjacent wide bands (where few, if any, signals would not be detected at all), but an appreciable dead zone between narrow bands (where an increasing number of symbols will not be detected at all), the difference in the number of symbols detected by either set indicates and identifies "bit errors". Thus, the accumulated difference in the number of symbols detected from wide detection as compared with the number detected from narrow detection is, over time, an indicator of the received bit error rate. Restated, comparison of the results of narrow detection and the results otherwise detected indicates errors in detection and provides a measure of the confidence held in the detection. The absence of any errors so detected enhances the confidence in the detection.

The dead zone between the narrow bands can be increased or decreased depending upon the desired detection sensitivity. For example, many more errors are tolerable with digitized voice before intelligibility is lost than with other data messages. Furthermore, the dead zone, and thus the sensitivity, can be altered as the system dynamics change by employing a programmable level detector.

Projected error rates may be utilized to dynamically adjust the communications system upon which the signal was received to affect the error rate. In systems that can take some kind of corrective action (such as antenna selection in a system with diversity antennas or such as handoff to a different transmitter in cellular systems), the corrective action can be predicated, at least in part, on the bit error rate exceeding a certain error threshold. The instant invention is particularly advantageous in that bit error rates, determined according to the instant invention, can be determined aperiodically, continuously, or at will. Known bit sequences need not be transmitted from time-to-time, usurping valuable system overhead, undermining system throughput and constraining bit error rate measurements to specific happenings or predetermined intervals. In fact, bit error rate checking over short intervals of, say, one hundred symbols can, by extrapolation and integration, indicate bit error rates over hundreds of thousands of symbols.

Figure 2:
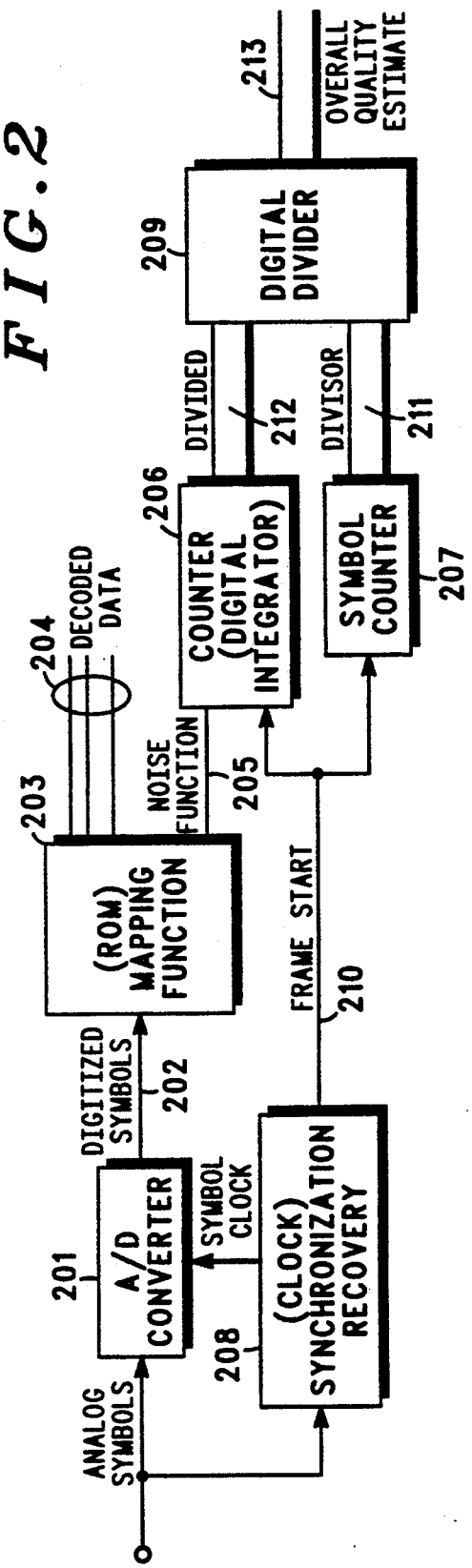
FIG. 2 is a block diagram of the preferred embodiment of a bit error rate detector according to the instant invention.

FIG. 2 is a block diagram of the preferred embodiment of a bit error rate detector according to the instant invention. It depicts:

A standard analogue-to-digital converter 201, such as Motorola part number MC10321DW, described in the "Motorola Linear and Interface Integrated Circuits" data manual. The input of the A/D 201 is fed with the analogue signal comprising the symbols to be decoded in parallel with clock recovery circuit 208. This clock recovery circuit 208 produces a symbol timing signal that indicates the optimum position for sampling the symbol, and can be realized by any of a number of well-understood methods, such as that taught by Ziemer and Peterson in "Digital Communications and Spread Spectrum Systems". This circuit also produces the "frame start" signal that identifies the beginning of a new data burst; this is also taught by Ziemer and Peterson.

The output lines 202 of A/D 201 are connected to the input (address) lines of Read-Only Memory (ROM) 203 that is programmed to perform the mapping function illustrated in FIG. 1 and described earlier. This mapping function produces two outputs on two sets of lines: the Decoded Data output 204, which is passed to the normal data-sink function, and the "Noise" function 205.

The Noise function 205 feeds a simple counter 206, which is used as a digital integrator. This counter is reset by the Frame Start function at the beginning of a data burst, henceforth counts the pulses emanating from the Noise Function line 205, corresponding to the number of symbols that are within one of the "noisy" or "high bit error rate" regions of FIG. 1.

Meanwhile, Symbol Counter 207 keeps track of the number of symbols received; its output 211 is fed into Digital Divider 209 as the divisor. The output of Counter 206 is fed into the dividend input 212 of divider 209. The output 213 of divider 209 is then continuously an estimate of the Bit Error Rate of the incoming symbol string, and may be sampled by the data-reduction circuits (data sink) at any time.

Note that many variations of this circuit are possible. For instance, if all symbols are of the same length, Counter 207 and divider 209 may be eliminated and the output of counter 206 read directly by the data sink. Alternatively, arrangements may be made to "freeze" counter 206 at a particular reading of symbol counter 207, eliminating the need for divider 209 by virtue of measuring the BER for a fixed portion at the beginning of each data burst.

In summary then, there has been provided a scheme for bit error rate detection. It comprises: detecting the bit value present in a received multi-level signal, more narrowly detecting the bit value present in that received multi-level signal, comparing the results of narrow detection with the results detected otherwise to identify errors in detection, and accumulating detected symbol errors over unit time. Bit error rate detection can be used for antenna selection—selecting one of a plurality of diversity antennas when the error rate exceeds a certain error threshold.

While the preferred embodiment of the invention has been described and shown, it will be appreciated by those skilled in the art that other variations and modifications of this invention may be implemented. For example, bit error rate could be associated (and stored) with the detected bit stream to indicate the level of confidence held in the detected bit or stream., and for example, individual comparators and a logic ladder could be used in place of the A/D's and ROMs.

These and all other variations and adaptations are expected to fall within the ambit of the appended claims.

What I claim and desire to secure by Letters Patents is:

1. A method of error detection comprising:
digitizing a received signal,
detecting that received signal,
more narrowly detecting that received signal, and
accumulating bit errors from detections outside the narrow detection, but otherwise detected.

2. A method as claimed in claim 1 above, further comprising: accumulating error rate over unit time.

3. A method as claimed in claim 1 above, wherein detected error rates are utilized to dynamically adjust the communications system and affect the error rate upon which the signal was received.

4. A method of antenna selection using error detection according to claim 1 and further comprising: selecting one of a plurality of diversity antennas when the error rate exceeds a certain error threshold.

5. A method of handoff using error detection according to claim 1 and further comprising: selecting one of a plurality of communications channels when the error rate exceeds a certain error threshold.

6. A method of error detection comprising:
digitizing a received signal,
detecting the level of that received signal,
more narrowly detecting the level of that received signal, and
accumulating bit errors from detections outside the narrow detection, but otherwise detected.

7. A method of bit error rate detection comprising:
digitizing a received signal,
detecting any bit values present in that received signal,
more narrowly detecting any bit values present in that received signal, and
accumulating bit errors from failed narrow detection of bit values otherwise detected.

8. A method as claimed in claim 7 above, further comprising: accumulating detected bit errors over unit time.

9. A method as claimed in claim 7 above, wherein bit error detection is performed without reference to a known bit sequence.

10. A method as claimed in claim 7 above, wherein communication of a known sequence for purposes of assessing error rates can be eliminated to enhance signal throughput.

11. A method as claimed in claim 7 above, wherein bit error rate detection can be performed aperiodically, continuously, or at will.

12. A method as claimed in claim 7 above, wherein bit error rate can be associated with the detected bit stream to indicate the level of confidence in the detected bit or stream.

13. A method as claimed in claim 1 above, wherein the absence of detected errors enhances the confidence in the detection.

14. A method as claimed in claim 1 above, wherein the narrowness of the narrow detection may be adjusted to the detection confidence desired.

15. A method as claimed in claim 1 above, wherein error detection is applied to multi-level signals.

16. A method of bit error rate detection comprising:

digitizing a received signal, detecting the bit values present in that received multi-level signal, more narrowly detecting any bit values present in that received multi-level signal, accumulating bit errors from failed narrow detection of bit values otherwise detected, and accumulating detected bit errors over unit time.

17. A method of antenna selection using bit error rate detection comprising:

digitizing a received signal, detecting the bit values present in that received signal, more narrowly detecting any bit values present in that received signal, accumulating bit errors from failed narrow detection of bit values otherwise detected, accumulating detected bit errors over unit time, and selecting one of a plurality of diversity antennas when the error rate exceeds a certain error threshold.

18. An error detector comprising, coupled in series:

means for digitizing a received signal, means for detecting that received signal, means for more narrowly detecting that received signal, and means for accumulating bit errors from detections outside the narrow detection, but otherwise detected.

19. A bit error rate detector comprising, coupled in series:

means for digitizing a received signal, means for detecting the bit values present in that received multi-level signal, means for more narrowly detecting any bit values present in that received multi-level signal, means for accumulating bit errors from failed narrow detection of bit values otherwise detected, and means for accumulating detected bit errors over unit time.

20. An antenna selector using bit error rate detection comprising, coupled in series:

means for digitizing a received signal, means for detecting the bit values present in that received signal, means for more narrowly detecting any bit values present in that received signal, means for accumulating bit errors from failed narrow detection of bit values otherwise detected, and means for selecting one of a plurality of diversity antennas when the error rate exceeds a certain error threshold.

* * * * *